L. W. CHUBB.
MEANS FOR SUPPRESSING HARMONICS.
APPLICATION FILED FEB. 13, 1917.
1,387,469.
Patented Aug. 16, 1921.
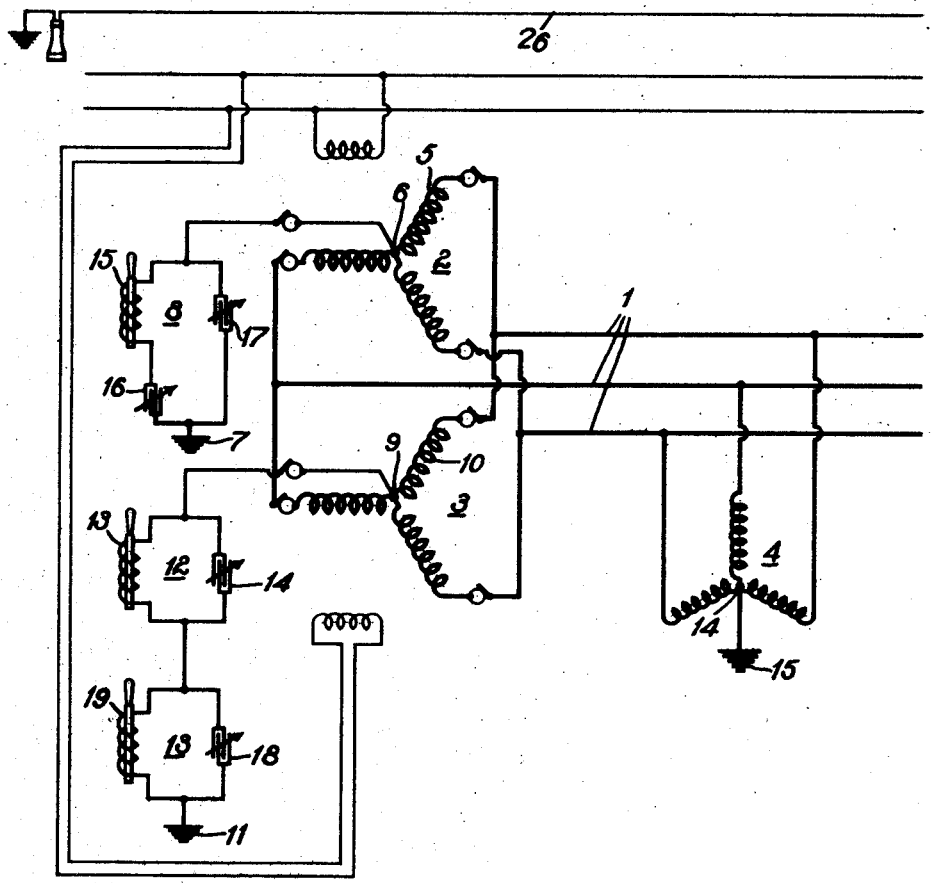
WITNESSES:
P. J. Fitzgerald
Geo. W. Hansen.
INVENTOR
Lewis W. Chubb.
BY
ATTORNEY

UNITED STATES PATENT OFFICE.

LEWIS W. CHUBB, OF EDGEWOOD PARK, PENNSYLVANIA, ASSIGNOR TO WESTING-HOUSE ELECTRIC & MANUFACTURING COMPANY, A CORPORATION OF PENNSYLVANIA.

MEANS FOR SUPPRESSING HARMONICS.

1,387,469.                    Specification of Letters Patent.    Patented Aug. 16, 1921.

Application filed February 13, 1917. Serial No. 148,425.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Means for Suppressing Harmonics, of which the following is a specification.

My invention relates to alternating-current distributing systems and particularly to means for suppressing the flow of currents of undesirable frequencies between the several units that may be embodied in such a system and may have neutral points that are connected to ground.

When an alternating-current distributing system having units that are provided with grounded neutral points is employed, circulating currents having frequencies in excess of the fundamental frequency may flow through a part of the system and the ground, by reason of the grounded neutral points, when the system or some part of it becomes resonant to voltage harmonics of certain frequencies that are impressed upon the system. In three-phase systems, relatively large third-harmonic currents may also circulate between the grounded neutral points, under certain conditions. These currents may occasion excessive potential differences in the distributing system, thereby causing insulation troubles. They may also unduly heat the electrical apparatus connected to the system, impair its efficiency of operation, and set up serious inductive disturbances in adjacent electrical circuits, such as telegraph or telephone circuits.

An object of my invention, therefore, is to provide means for substantially precluding the flow of alternating currents of undesirable selected frequencies through the grounded neutral points of such electrical devices as may be connected to a common distributing system. At the same time, alternating currents of other selected frequencies may flow substantially non-reactively through the grounded connections.

The single figure of the accompanying drawing is a diagrammatic view of an alternating-current distributing system embodying a form of my invention.

An alternating-current distributing system, comprising mains 1, is furnished with power by means of polyphase alternators 2 and 3 that are connected in parallel-circuit relationship with the mains 1. A polyphase winding 4, which may represent a transformer or any other electrical device, is supplied with power delivered by the mains 1.

The alternator 2 is provided with a Y-connected armature winding 5 the neutral point 6 of which is connected to a ground 7 through a tuned circuit 8. Similarly, a neutral point 9 of a Y-connected armature winding 10 embodied in the alternator 3 is connected to a ground 11 through resonant circuits 12 and 13. The winding 4 has its neutral point 14 also connected to a ground 15.

Under certain conditions, and these exist especially when the neutral points of Y-connected windings of a system are connected to ground, it may be assumed that harmonic currents will flow over the distributing mains 1 and through the ground connections, thereby inducing serious disturbances in an adjacent telephone circuit 26 that parallels the alternating-current distributing system for longer or shorter distances. Again, it is conceivable that, when the neutral points are grounded, resonance may be established in a certain portion of the system for an alternating current of a selected frequency. An initial current impulse of this selected frequency may, of itself, be of insufficient magnitude to establish any serious difference of potential between the mains of the system, but, by reason of the resonance obtaining in the system, this impulse may establish very high differences of potential which will cause insulation troubles. In either case, these disturbing harmonic currents may be prevented from flowing by inserting means between the neutral points and ground which will substantially preclude the flow of these disturbing currents in the ground circuit.

Assume, for instance, that a ninth-harmonic impulse is impressed upon the system and that it establishes very high potentials therein because the system resonates, by accident, to a ninth-harmonic current. The resonant circuit 12, comprising an adjustable inductive element 13 and an adjustable condensive element 14 is, therefore, tuned to establish a parallel resonant circuit 12, which substantially precludes the flow of a ninth-harmonic current between the ground connection 11 and the neutral point 9. At the same time, the circuit 8, which comprises an adjustable inductive element 15, an adjustable condensive element 16 and a second adjustable condensive element 17, arranged as shown, is likewise tuned to establish parallel resonance to the ninth-harmonic impulse in order to preclude the flow therethrough of ninth-harmonic currents. The ninth-harmonic currents are, therefore, prevented from flowing through the ground, and consequently, are suppressed.

If these ninth-harmonic currents are also responsible for impressing inductive disturbances upon the telephone circuit 16, the consequent interference with the operation of the telephone circuit is eliminated. If another harmonic impulse is present in the voltage wave of one of the alternators; for instance, that of the alternator 3, this second harmonic impulse may be suppressed by the resonant circuit 13 which comprises a condensive element 18 and an inductive element 19 that are connected in parallel with each other. The electrical constants of these two elements 18 and 19 are so adjusted that the circuit 13 establishes parallel resonance for this undesired harmonic current.

If it is desired to supply a third-harmonic component to the alternator 2, a non-reactive path therefor is provided through the ground by supplying the condenser 16 for the circuit 8. The condenser 16 is connected in series with the inductive element 15 and they are so adjusted that a series resonant circuit is established therethrough for the third-harmonic-component current. While the series circuit comprising the elements 15 and 16 is tuned to the third-harmonic component, it will possess an inductive characteristic when impressed with the ninth-harmonic current. Therefore, the condensive element 17 is connected in shunt relationship to the elements 15 and 26 and so adjusted as to establish parallel resonance in the circuit 8 for the ninth-harmonic current.

From the foregoing description, it will be apparent that undesirable alternating currents of other frequencies may be substantially precluded from flowing in the system by connecting parallel resonant circuits between the proper grounded neutral points of the electrical devices connected to the system.

Although I have shown my invention in one of its forms, it is evident that the invention is applicable to other modifications which do not depart from the spirit and scope as set forth in the appended claims.

I claim as my invention:

1. In an alternating-current distributing system, the combination with a polyphase winding having a neutral point that is adapted for connection to ground, of means connected in circuit between said neutral point and ground which substantially precludes the flow, through said grounded neutral point, of an alternating current of a selected frequency and which permits the non-reactive flow therethrough of an alternating current of another selected frequency.

2. The combination with an independent electrical circuit, of an adjacent alternating-current distributing system inductively related thereto and comprising polyphase windings having neutral points that are connected to ground, and means for preventing the flow, through said neutral points and ground, of alternating currents of a given frequency that may inductively interfere with the proper operation of said independent electrical circuit while allowing the flow therethrough of all other currents.

3. In an alternating-current distributing system, the combination with a plurality of polyphase windings having neutral points that are connected to ground, of means connected in circuit with some of said grounded neutral points for substantially precluding the flow, through ground and between some of the said windings, of alternating currents of a given frequency and for permitting the non-reactive flow through ground and between some of the said windings of alternating currents of another given frequency.

4. The combination with a polyphase network, of a plurality of polyphase translating devices adapted to be connected to said network, each of said devices having a neutral point, and impedance elements connecting said neutral points together, characterized by the fact that said impedance elements are selectively conductive for currents of a particular frequency while impeding currents of all other frequencies.

In testimony whereof, I have hereunto subscribed my name this 29th day of January, 1917.

LEWIS W. CHUBB.